Dec. 20, 1955     J. R. OISHEI ET AL     2,727,271
SNOW BLADE
Filed Feb. 2, 1953
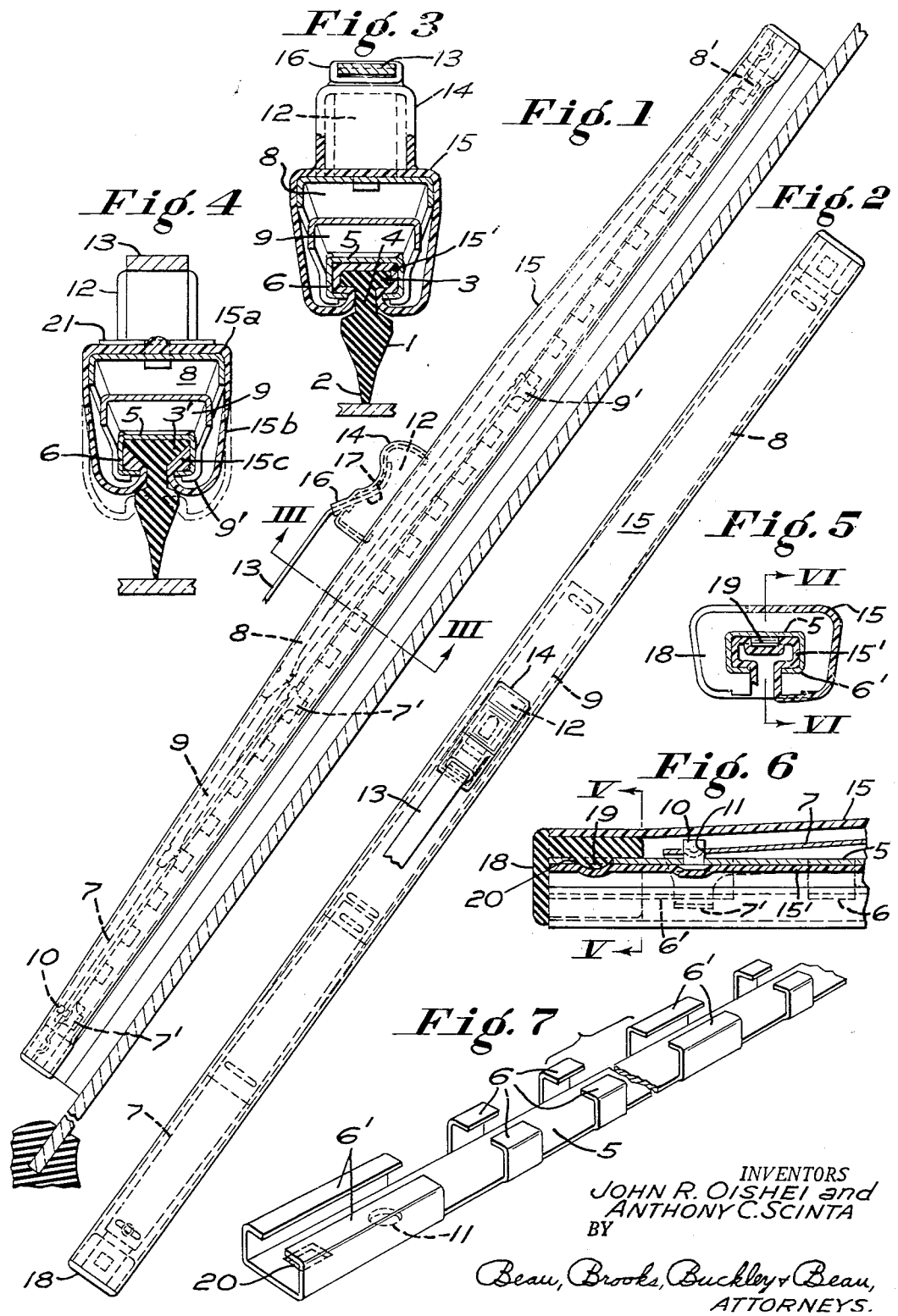
INVENTORS
JOHN R. OISHEI and
ANTHONY C. SCINTA
BY
Bean, Brooks, Buckley & Bean,
ATTORNEYS.

United States Patent Office 2,727,271
Patented Dec. 20, 1955

2,727,271
SNOW BLADE

John R. Oishei and Anthony C. Scinta, Buffalo, N. Y.; said Scinta assignor to Trico Products Corporation, Buffalo, N. Y.

Application February 2, 1953, Serial No. 334,482

18 Claims. (Cl. 15—245)

This invention relates to the wiping of the curved windshields of modern automobiles and like motor vehicles wherein the wiping edge of a blade is conformed to the surface being wiped by means of a pressure-applying or distributing frame. This frame is composed of a plurality of relatively movable parts brought together and fabricated into a flexible superstructure by and through which the arm-applied pressure is distributed along the squeegee unit in a manner to flex its wiping edge down upon the surface into substantial conformity thereto for insuring a clean wipe. In freezing weather, accumulations of ice and wet snow on the frame will pack and jam between its relatively movable parts of the frame to impair its flexibility if not wholly freezing the frame into a rigid unit.

The primary object of this invention is to protect the relatively movable parts of the pressure applying and distributing frame from the weather in a practical manner to preserve the surface conforming characteristic of the wiper and to provide for an economy in manufacture not heretofore obtained.

In an earlier application Serial No. 259,593 it was proposed to inclose a pressure distributing frame within a weather hood, the latter being molded with the blade as a unit. This presented certain problems both in the molding as well as in the process of assembling the several components of the wiper. The present invention is designed to overcome these problems. It resides in the mounting of a weather hood and its incorporation in the wiper structure to effectively seal out the weather and at the same time to facilitate the assembling of the frame within the hood through an interlock which is established by and upon the placement of the blade in position.

The invention further contemplates the use of a hollow or tubular hood to wholly envelope the flexible superstructure as a part distinct therefrom and thereafter to utilize the blade as a key for securing the wiper assembly intact. Again, the invention resides in a novel inclosure for the superstructure which will also afford protection for the arm attachment coupling.

The foregoing and other objects will manifest themselves as their description progresses, reference being made herein to accompanying drawing, wherein Fig. 1 is a side elevation of the preferred embodiment of the present invention;

Fig. 2 is a top plan view of the improved blade;

Fig. 3 is a transverse sectional view about on line 3—3 of Fig. 1;

Fig. 4 is a similar view showing in cross section a modified embodiment of the invention;

Fig. 5 is a cross sectional view of the preferred embodiment taken about on line 5—5 of Fig. 6;

Fig. 6 is a fragmentary longitudinal sectional view about on line 6—6 of Fig. 5; and Fig. 7 is an inverted perspective view, in fragment, of the flexible backing for the blade.

Referring more particularly to the drawing, the numeral 1 designates the flexible body of the blade formed of rubber, either natural or synthetic, and having an attenuated wiping edge 2 along one margin and an anchoring bead or enlargement 3 along its opposite margin, the bead being joined to the body by a reduced neck 4.

The blade is supported by a flexible backing in the form of a resilient strip 5 having opposed series of retaining fingers 6 arranged along its opposite side margins and forming a longitudinal seat-forming channel for the anchoring bead 3. This flexible spring backing constitutes the lower side and longitudinal frame member of a flexible pressure applying and distributing frame and serves to restore the frame to a balanced state when permitted. The upper side of this spring frame may be composed of plural longitudinal frame members including the single yoke 7, a primary lever 8, and an intermediate lever 9, with the opposite ends of the yoke and the remote or outer ends of the levers engaging the backing. The inner end of the intermediate lever is rockably anchored to the yoke medially thereof, and the inner end of the primary lever is rockably mounted on the intermediate lever between the ends thereof. This arrangement and the advantages flowing therefrom are more fully set forth in copending application Serial No. 287,506. The opposite ends of the yoke and the outer ends of the lever have terminal claws 7', 8', 9', respectively, which straddle the backing and turn in beneath the adjacent fingers 6' with a sliding embrace to support the same at longitudinally spaced points for surface-conforming action. For this purpose such adjacent fingers may be increased in width to insure adequate bearing surface for the claw engagements. The frame parts are secured against lengthwise displacement by a headed retaining pin 10 passed upwardly through registering holes 11 in the backing strip and the yoke where it is held by the backing support afforded by the anchoring bead 3.

A mounting clip 12 is fixed on the primary lever for attaching the wiper to a well-known oscillatory arm 13 of articulated design and embodying a spring to resiliently press the wiper against the windshield. The operation of this wiper is apparent from the foregoing, the collapsible and foldable superstructure, which consists of the several frame members, serving to spread the arm-applied pressure lengthwise over the backing to cause it to yield in conformance to the blade as it rides over the varying curvatures found in the surface contour of the windshield.

The purpose of this invention is to preserve the surface-conforming flexibility of the blade carrier frame 5, 6, 7, 8, 9 in a practical manner, it being appreciated that wet snow can pack between the relatively movable parts of the frame, if exposed, to obstruct their freedom of action, or moisture may accumulate upon such parts and freeze them immovable and render the wiper rigid and therefore useless on the modern curved windshield. Accordingly then, a weather bonnet or hood 15 is provided to inclose the surface-conforming action or frame. This weather hood may be open at one end only or both ends may be open, to enable the endwise introduction of the pressure-distributing frame thereinto. Its periphery or perimetric extent transversely is continuous thereabout, with its medial portion being of greatest girth and a taper therefrom toward the opposite ends. This relatively greater medial girth will afford the necessary clearance for the central frame parts in passing over a curved area.

In molding this tubular weather hood, it is preferred though not necessary to have the core follow generally the external configuration of the superstructure or frame as shown in Fig. 3 and in fragment in Fig. 5. The weather hood is preferably formed of rubber and it provides a thin-walled envelope for the moving parts of the pressure-spreading superstructure or frame. The thin walls are elastic and readily flex and stretch, fold and roll, as the frame folds and unfolds. This wall action will resist the accumulation of ice and snow by breaking the adhesion of the frozen matter thereto. In following the general exterior shape of the superstructure, the top side wall of the hood chamber will have a clip-receiving recess giving access to the mounting clip 12. About this recess is a weathersealed clip-receiving pocket 14 and a projecting weather collar 16 through which latter is passed the curved tongue or terminal 17 of the wiper arm 13. This pocket formation insures a weather proof inclosure for the movable latch parts within the clip housing 12 whether the latter be fixed or pivotal. A further advantage for the preshaped molding of the hood is that the underside of the hood is shaped as an inverted channel 15' to fit within the channel of the backing and in turn to receive the anchoring bead 3. This is clearly shown in Fig. 3, where it will be observed that by the placement of the wiping blade in the lower side of the pressure distributing frame, the endwise introduction of the anchoring bead into the already positioned anchoring channel 15' will automatically fasten and secure the underside of the hood to the flexible backing.

Each open end of the weather hood may be closed by a rubber plug 18 which is of sufficient expanse to close the end of the hood channel 15' and to also block the removal of the anchoring bead 3. It may be secured in place by a nib 19 entering a recess 20 in the backing strip. This arrangement provides the wiper with removable tips acting in a threefold capacity first to guard and protect the windshield glass from being scratched by the metal backing, then to seal the frame-receiving chamber of the hood, and finally to anchor the hood or envelope to the frame.

In the modification of Fig. 4 the underside of the weather hood 15a has been divided longitudinally and the free margins of the side walls 15b provided with anchoring beads 15c which are received by the backing channel and secured therein by and upon placement of the anchoring bead 3' of the blade. The arm attaching clip 12 may project through an opening in the hood and the latter clamped down thereabout by a border ring 21. This hood design lends itself to a different molding process while providing weather protection for the inclosed pressure distributing frame.

The weather hood, the blade and the pressure spreading members are interlockingly anchored into a flexible weatherproof wiper which is economical to manufacture and equally effective in use in all weathers. The blade is removably supported by a frame member at the lower side of the pressure distributing frame. Its placement seals the frame to the weather. The side walls of the hood are free to stretch and fold or roll to dislodge ice therefrom for maintaining the desired performance.

The foregoing description has been given in detail for clearness and ease of understanding. It is to be understood that the inventive principles involved are capable of assuming other physical embodiments without departing from the spirit of the invention and the scope of the appended claims.

What is claimed is:

1. A surface conforming wiper for curved windshields, comprising a foldable spring frame having upper and lower frame members movable toward and from each other, a weather hood inclosing the frame, means for attaching the upper side of the frame to a pressure applying actuating arm, and a flexible blade removably interlocked with the lower frame member and having parts interlockingly engaging the hood to anchor it to the frame.

2. A wiper conformable to a curved windshield, comprising a pressure-distributing member having a blade-receiving seat and plural parts movable relatively to each other in transmitting arm pressure to such seat, a weather hood for the member having side walls inclosing the relatively movable parts from the weather and interlocked in the seat, and a flexible blade engaging the hood portion in the seat to secure the interlock.

3. A wiper for curved windshields, comprising a flexible pressure-distributing frame having an arm attaching construction on its upper side and a blade-receiving seat on its lower side, said frame having plural parts relatively movable for distributing an arm-applied pressure to the seat, a weather hood inclosing the frame and interlocked in the seat, a wiping blade slidable into the seat and securing the interlock when positioned therein, and means operating to hold the blade in the seat.

4. A wiper for a curved windshield, comprising a flexible wiping blade, an elongate flexible backing supporting the same, a pressure-distributing arrangement of relatively movable parts for applying pressure therealong, said backing having a blade-receiving seat in its underside, and a weather hood inclosing the relatively movable parts and the backing and secured in the seat by the blade.

5. A wiper for a curved windshield, comprising a flexible wiping blade, an elongate flexible backing supporting the same, a pressure-distributing arrangement of relatively movable parts connected to the backing at longitudinally spaced points and forming therewith a flexible frame in which the backing is positioned at the lower side thereof, and a weather hood covering over the frame and having side walls extending downwardly on opposite sides of the relatively movable parts and the backing to close them to the weather, the side walls having their lower portions anchored to the backing by said blade.

6. A wiper for a curved windshield, comprising a flexible wiping blade, an elongate flexible backing supporting the same, a pressure-distributing arrangement of relatively movable parts connected to the backing at longitudinally spaced points and forming therewith a flexible frame in which the backing is positioned at the lower side thereof, and a tubular weather hood covering over the frame and having side walls extending downwardly on opposite sides of the relatively movable parts and the backing to close them to the weather, the side walls having their lower portions integrally joined across the underface of the backing, and said blade and backing interlockingly engaging each other through the joined portion.

7. A wiper for a curved windshield, comprising a flexible wiping blade, an elongate flexible backing supporting the same, a pressure-distributing arrangement of relatively movable parts connected to the backing at longitudinally spaced points and forming therewith a flexible frame in which the backing is positioned at the lower side thereof, a weather hood covering over the frame and having side walls extending downwardly on opposite sides of the relatively movable parts and the backing to close them to the weather, the side walls having their lower portions anchored to the backing by said blade, and an arm attaching clip on the upper side of the frame, the weather hood having a pocket formed on it for receiving the clip.

8. A wiper for a curved windshield, comprising a flexible wiping blade, an elongate flexible backing supporting the same, a pressure-distributing arrangement of relatively movable parts connected to the backing at longitudinally spaced points and forming therewith a flexible frame in which the backing is positioned at the lower side thereof, a weather hood covering over the frame and having side walls extending downwardly on opposite sides of the relatively movable parts and the backing to close them to the weather, the side walls having their lower portions formed with beads anchored to the backing by said blade, and an arm attaching clip on the upper side of the frame, the weather hood having a pocket formed on it to receive the clip, said pocket being formed with a weather tight collar designed to receive an arm for engagement with the clip.

9. A wiper for a curved windshield, comprising a flexible wiping blade, an elongate flexible backing supporting the same, a pressure-distributing arrangement of relatively movable parts connected to the backing at longitudinally spaced points and forming therewith a flexible frame in which the backing is positioned at the lower side thereof, said frame having reduced ends, and a tubular weather hood covering over the frame and having side walls extending downwardly on opposite sides of the relatively movable parts and the backing to close them to the weather, the side walls having their lower portions integrally joined across the underface of the backing, the hood tapering toward its opposite ends to receive the reduced ends of the frame, and said blade and backing interlockingly engaging each other through the joined portion.

10. A wiper for a curved windshield, comprising an elongate flexible wiping element, an elongate carrier frame flexible in a plane substantially normal to such curved windshield, said carrier frame having a laterally rigid lower frame member and a laterally rigid pressure distributing upper frame member, said lower frame member providing means for interlockingly anchoring the flexible wiping element thereon, a flexible elongate hood having engaging surfaces extending longitudinally of said lower frame member and said wiping element, and means for interlocking the lower frame member through the engaging surfaces of the hood with the wiping element to envelope the frame.

11. A wiper for curved windshields, including a flexible though laterally rigid frame supporting a wiping element for conforming it to a curved surface, and a flexible envelope of stretchable material inclosing the frame; the frame, the wiping element and the envelope having longitudinally extending portions cooperatively interlocked with each other by and upon relative movement therebetween; and means to prevent endwise displacement of the longitudinally cooperatively interlocked parts.

12. A non-clog windshield wiper for curved windshields, comprising an elongate flexible blade, a carrier frame having movable longitudinally extending members foldably arranged to receive and distribute pressure from an actuating wiper arm, a flexible carrier member slidably supported by the movable members and detachably mounting the blade, and a flexible envelope inclosing both the carrier frame and the carrier member and interlocked between the latter and the blade, said envelope serving to prevent the entry of clogging deposits between the frame member and the carrier member whereby the pressure distributing members may be substantially fully applied to the blade to conform the blade to said curved windshield.

13. A wiper for curved windshields, comprising a flexible blade, a pressure-distributing frame of foldably connected parts supporting the blade for conforming it to a surface being wiped, and a collapsible tubular elastic envelope inclosing the frame and having frame-distensible side walls receiving the latter therebetween and interlocked between the frame and the blade.

14. A weather hood for a curved windshield wiper having a foldable pressure distributing superstructure, said hood comprising a tubular elastic envelope for inclosing the superstructure and having thin side walls capable of folding upon themselves to dislodge congealed matter therefrom, said envelope having a medial recess exposing an arm-attachment on the superstructure.

15. A weather hood for a curved windshield wiper having a pressure distributing superstructure, said hood comprising a tubular elastic envelope for inclosing the superstructure having an arm-attaching clip, said envelope having a medial outstanding pocket for receiving and inclosing such a clip.

16. A weather hood for a curved windshield wiper having a pressure distributing superstructure, said hood comprising a tubular elastic envelope for inclosing the superstructure having an arm-attaching clip, said envelope having a medial outstanding pocket for receiving and inclosing such a clip, said pocket having an elastic collar for hugging an arm when engaged in the clip.

17. A wiper for curved windshields, comprising a rubber blade, a pressure-distributing frame of relatively movable parts supporting the blade for conforming it to a surface being wiped, a tubular elastic envelope inclosing the frame and having side walls receiving the latter therebetween and being connected to the blade, the ends of the envelope being open, and closure plugs for the open ends, said plugs being connected to the frame to anchor the envelope.

18. A weather hood for a curved windshield wiper having a pressure distributing superstructure, said hood comprising a tubular elastic envelope for inclosing the superstructure, said envelope having a medial recess exposing an arm-attachment on the superstructure, the ends of the envelope being closed and provided with anchoring means for engaging such superstructure.

References Cited in the file of this patent

UNITED STATES PATENTS

| | | |
|---|---|---|
| 2,543,383 | Scinta et al. | Feb. 27, 1951 |
| 2,583,710 | Scinta | Jan. 29, 1952 |
| 2,596,063 | Anderson | May 6, 1952 |